Aug. 12, 1924.
E. Y. TARKINGTON
TOMATO HARVESTER
Filed Dec. 30, 1922
1,504,846
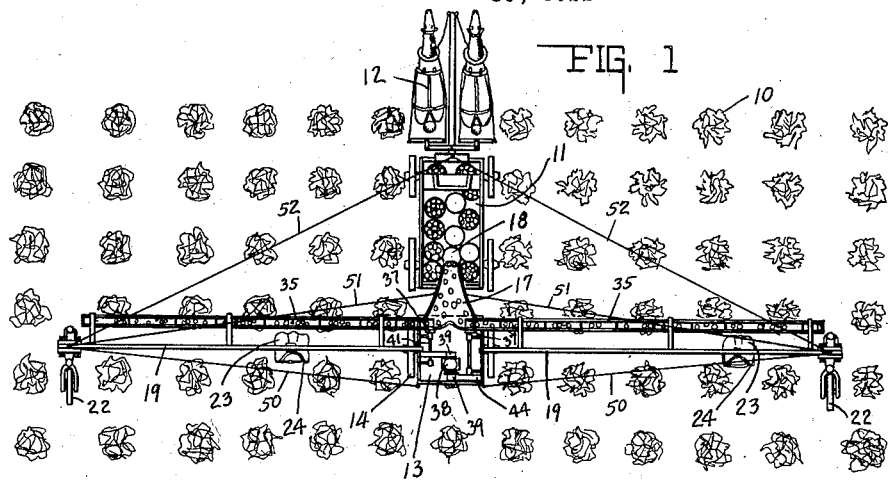
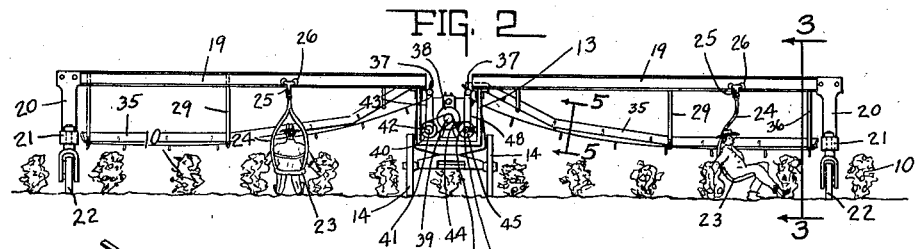
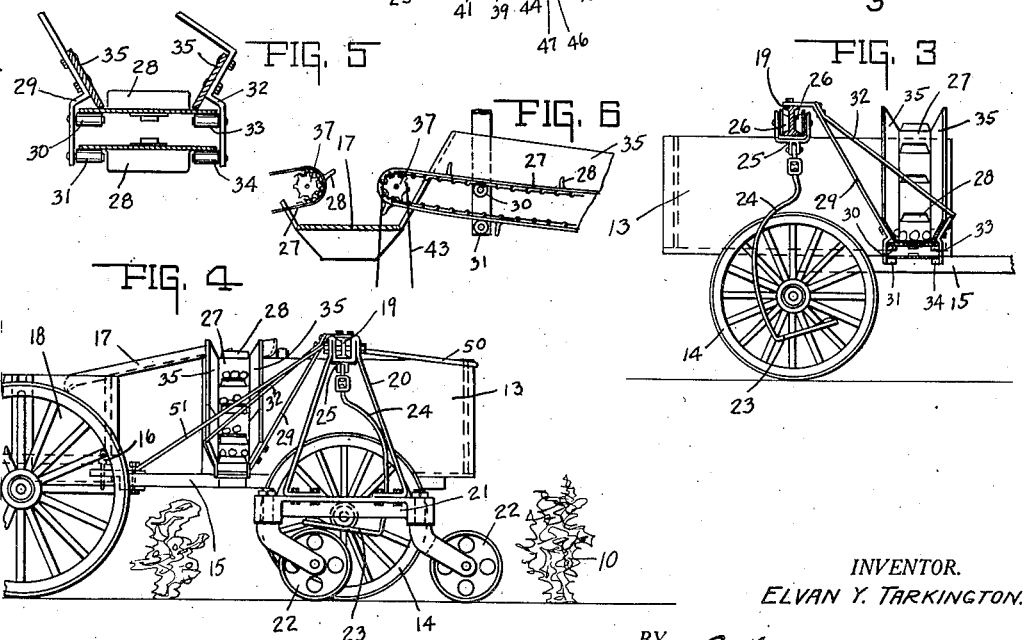
INVENTOR.
ELVAN Y. TARKINGTON.
BY
ATTORNEYS.

Patented Aug. 12, 1924.

1,504,846

UNITED STATES PATENT OFFICE.

ELVAN Y. TARKINGTON, OF INDIANAPOLIS, INDIANA.

TOMATO HARVESTER.

Application filed December 30, 1922. Serial No. 609,920.

*To all whom it may concern:*

Be it known that I, ELVAN Y. TARKINGTON, a citizen of the United States, and a resident of Indianapolis, county of Marion, and State of Indiana, have invented a certain new and useful Tomato Harvester; and I do hereby declare that the following is a full, clear, and exact description thereof, reference being had to the accompanying drawings, in which like numerals refer to like parts.

This invention relates to a harvesting carriage and delivery, and more particularly to an attachment for an agricultural wagon for use in picking and gathering tomatoes and the like.

The main object of the invention is to provide an attachment that will facilitate the picking and harvesting of tomatoes and the like by providing a carriage in which the pickers may be seated, so arranged as to permit them to remain seated in a comparatively comfortable position within easy reach of the tomato plants and the ground and still permit one picker to cover several rows of plants. Heretofore the practice has been such that the picker must constantly stoop down and cover the ground and the plants continuously in a stooping posture, which not only becomes tiresome but soon unbearable. The purpose, therefore, of the invention is to not only make the work of picking tomatoes easier and more endurable, but more rapid as to the ground covered per man.

Another feature of the invention resides in the delivery mechanism whereby an endless carrying belt is provided, and so positioned that it is not necessary for the picker to fill one basket at a time and then carry it to a given place to be picked up, but may toss the tomatoes as they are picked directly on to the carrying belt which will deliver the same ultimately into a receptacle already placed in the wagon. This arrangement greatly saves both time and energy in the harvesting of tomatoes and like articles.

The full nature of this invention will be understood from the accompanying drawings and the following description and claims.

In the drawings Fig. 1 is a plan view looking down on a wagon with the attachment mounted thereon. Fig. 2 is a rear elevation of the attachment showing the pickers in place. Fig. 3 is an enlarged section taken on the line 3—3 of Fig. 2. Fig. 4 is an enlarged view of an end elevation of the attachment. Fig. 5 is an enlarged cross section taken on the line 5—5 of Fig. 2. Fig. 6 is an enlarged view of the delivery belt drive.

In the drawings there is shown the representation of a tomato field having a plurality of plants 10 from which it is desired to pick the tomatoes. The usual form of wagon 11 is employed, driven by a team of horses 12. Attached to the rear of the farm wagon and pivoted thereto as a trailer there is a cart 13, which may be attached and removed from the wagon when it is loaded.

The cart 13 is provided with a bed mounted on the cart wheels 14 spaced apart a distance equal to the wheels of the wagon so that the cart will span a single row of plants, as shown in Fig. 2. Said cart is provided with the usual tongue 15 pivotally connected to the rear of the wagon by a dowel pin 16 in the usual manner. Positioned in the forward end of the cart 13 there is a chute 17 into which the tomatoes are delivered, which extends over the tail board of the wagon in position to discharge into the baskets 18.

Rigidly mounted on the side boards of the cart and extending transversely therefrom in each direction, there are I-beams 19. Said I-beams are of such length as to extend from each side of the wagon over approximately five rows of plants and are supported at their opposite ends so as to be substantially parallel with the ground. The other ends of said beams are rigidly mounted on the supporting brackets 20, which in turn are mounted on the bar 21 in which the usual caster wheels 22 are pivotally mounted so as to swivel thereon. The caster wheels 22 ride upon the ground so that as the wagon is pulled along over the plants the beams 19 will be moved with it in fixed relation, the swivel casters accommodating themselves to variations in the ground surface.

Suspended from the beams 19 there are seats 23 adapted to hold the picker in an inclined and easy seated position, as shown in Fig. 2. The seats 23 are supported by the hanger rods 24 which are swung from the supporting bracket 25, said bracket being in turn supported upon the roller 26 carried by the lower flange of the I-beam, two on each side thereof. This will permit the picker to move the seat back and forth from one end of the beam to the other and swing it around in any desired position. The seat being hung close to the ground, the picker can move it back and forth by pushing thereon with his feet and will rest in such position as to be within easy reach of the tomatoes close to the ground. One seat and picker is positioned on each side of the cart so as to enable the two pickers to cover ten rows of plants, as shown, as the cart is moved across the field.

For delivering the picked tomatoes to the baskets there are provided endless carrying belts 27 having transverse ribs 28 thereon, which extend from the sides of the cart to adjacent the ends of the beams a little forward thereof. The belts are supported by the brackets 29 secured at one end to the top of the beams 19 and extending downwardly and forwardly therefrom to the adjacent side of the belt, said brackets carrying on the lower end thereof a set of rollers 30 and 31 spaced apart so that the belt will ride over and be supported by the rollers 30 when moving toward the cart with a load of tomatoes, and will pass over and be supported by the rollers 31 when returning. A second bracket support 32 is provided for further supporting the opposite side of the belt from the bracket 29 and has mounted thereon the rollers 33 and 34 which correspond to the rollers 30 and 31 respectively. Secured on said brackets 29 and 32 there are side flanges 35 for maintaining tomatoes in place upon the carrying belt. On the supporting bracket 36 adjacent the outer end of the beams 19, there is a suitable roller about which the belt travels and at the opposite end thereof there is a driving roller 37 mounted on the side of the cart and having suitable teeth for engaging the belt and moving it forward. The delivery ends of the belts are so positioned as to deliver the tomatoes into the chute 17 so that they may be discharged into the baskets 18.

For driving the carrying belts 27 there is positioned in the bed of the cart a small gasoline motor 38 having double pulleys 39 thereon, one of which is adapted to drive the pulley 40 mounted on the shaft 41 on which is keyed the pulley 42 which will drive the roller 37 through the belt 43. The other pulley 39 drives the reversing belt 44 which in turn drives the pulley 45 mounted on the shaft 46 upon which is keyed the pulley 47 which drives the other roller 37 through the belt 48. The pulleys so reduce the driving speed as to move the belts slowly.

For bracing the laterally extending beams there are provided guys or cables 50 connecting the ends of the beams with the rear of the cart, and the guys or cables 51 connecting the ends of the beams with the tongue of the cart. In attaching the cart to the wagon the cables 52, which are secured to the ends of the beams, are also attached to the front end of the wagon so as to further brace the attachment with respect thereto.

In operation the picking may be done by three men, one to stand in the wagon attending to the horses and replacing the filled baskets with empty ones, and one man in each of the seats. Upon the device being moved into the desired position, the pickers lean back in their seats, pick the tomatoes and toss or place them on to the carrying belt as it is driven by the motor. As each plant is picked the picker pushes his seat back or forth by engaging the ground with his feet so as to be in position to pick another plant, and while the wagon is in a single position the picker may pick the tomatoes from ten plants, which tomatoes will be delivered into baskets carried by the wagon and then the wagon will be moved forward two rows where the same operation will be repeated.

It will be understood that whereas the above described attachment or harvester has been described as applied to tomatoes, it may equally well apply to the harvesting of any vegetable, berry, cotton or similar growths requiring picking from plants close to the ground or off of the ground.

The invention claimed is:

1. A harvester attachment of the class described, comprising a vehicle, a laterally extending supporting beam supported at one end upon said vehicle, means for supporting the opposite end of said beam independently of said vehicle, and a movable seat suspended from said beam in position to be moved back and forth from one end to the other whereby said seat may cover an appreciable extent of ground while said vehicle remains stationary.

2. A harvester attachment of the class described, comprising a vehicle, a laterally extending supporting beam supported at one end upon said vehicle, a pivotally mounted caster for supporting the outer end of said beam, and a movable seat supported by said beam in position to be moved back and forth from one end to the other whereby said seat may cover an appreciable extent of ground while said vehicle remains stationary.

3. A harvester attachment of the class described, comprising a vehicle, a laterally extending supporting beam detachably supported at one end upon said vehicle, means for supporting the opposite end of said beam independently of said vehicle, a carriage mounted on said beam so as to freely move longitudinally thereof from one end to the other, and a seat suspended from said carriage for supporting a picker.

4. A harvester attachment of the class described, comprising a vehicle, a laterally extending supporting beam supported at one end upon said vehicle, means for supporting the opposite end of said beam, a carriage mounted on said beam so as to freely move longitudinally thereof from one end to the other, a seat suspended from said carriage for supporting a picker, an endless carrying belt adapted to extend from said vehicle adjacent the forward end of said beam, brackets secured to said beam and extending downwardly therefrom in position to support said carrying belt, means mounted on said vehicle for operating said carrying belt, and a discharge chute mounted on said vehicle for receiving the product discharged by said belt and directing the same into a container therefor.

5. A harvester attachment of the class described, comprising a vehicle, oppositely and laterally extending supporting beams supported at one end upon said vehicle, means for supporting the opposite ends of said beams, carriages mounted on said beams so as to freely move longitudinally thereof from one end to the other, a seat suspended from each of said carriages so as to be free to rotate with respect thereto, endless carrying belts adapted to extend from said vehicle to the adjacent and forward ends of said beams, brackets secured to said beams and extending downwardly therefrom in position to support said carrying belts, a motor mounted in said vehicle for driving said carrying belts, and a discharge chute mounted on said vehicle for receiving the product discharged by said belts and directing the same into a container.

In witness whereof, I have hereunto affixed my signature.

ELVAN Y. TARKINGTON.